UNITED STATES PATENT OFFICE.

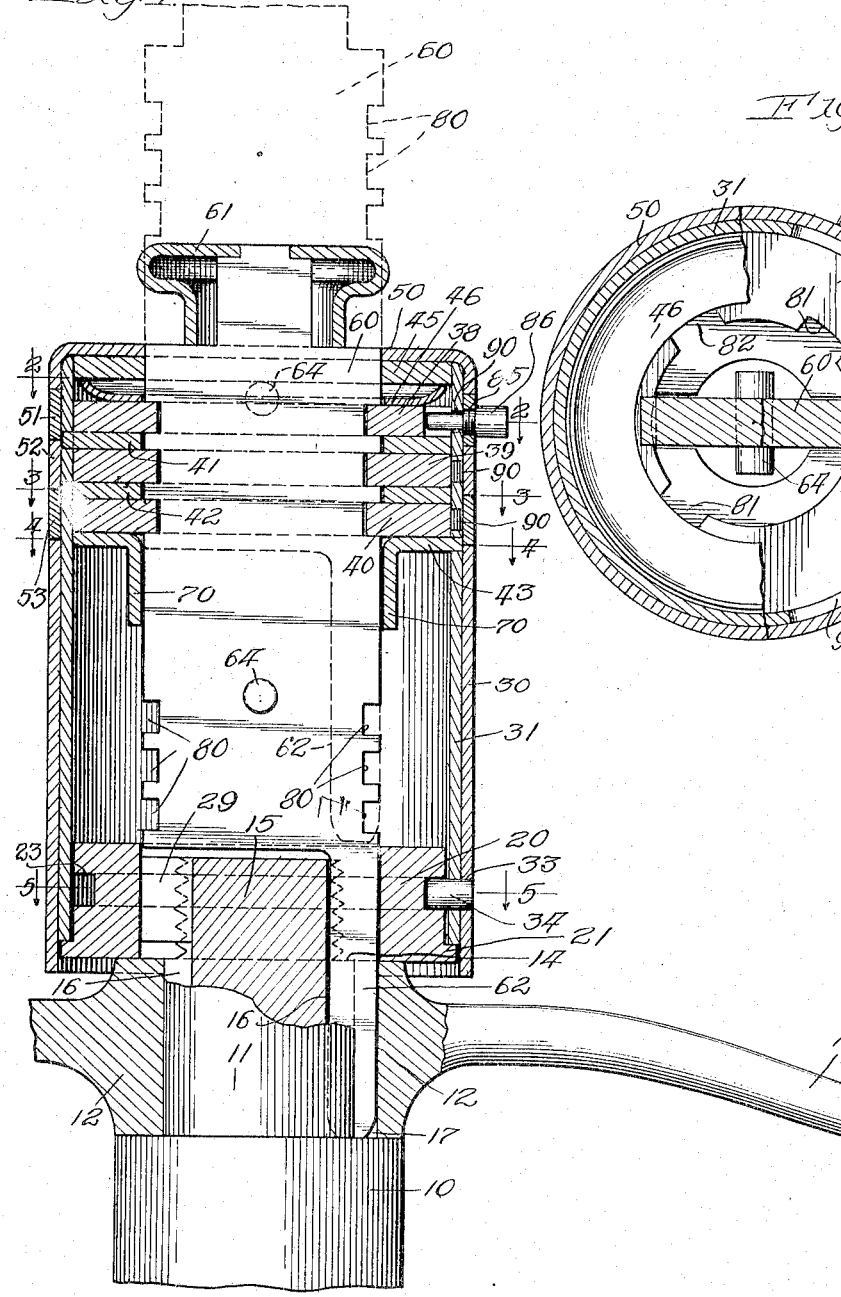

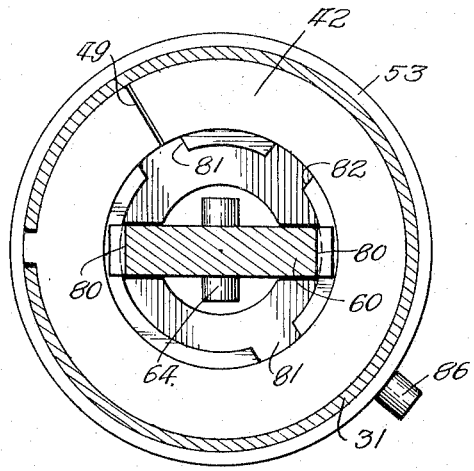
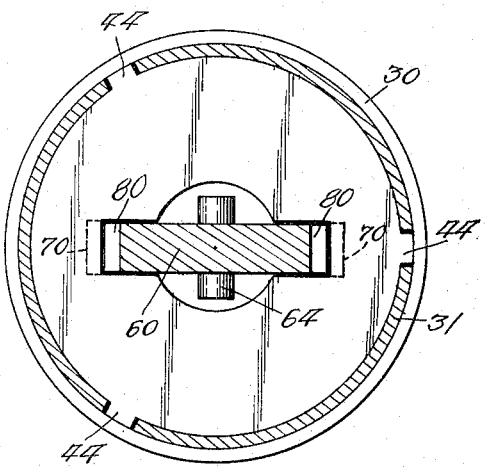
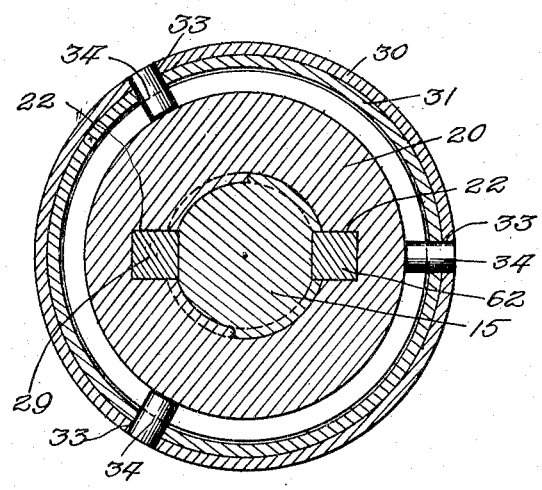
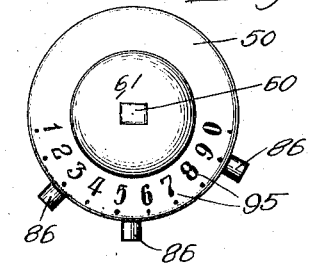
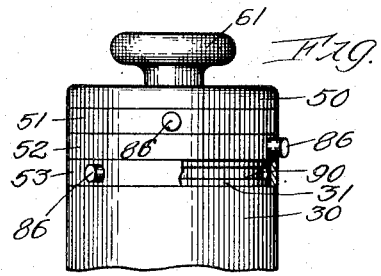

IGNACE IZSAK, OF CHICAGO, ILLINOIS, ASSIGNOR TO GENERAL PATENT MANUFACTURING COMPANY, A CORPORATION OF ILLINOIS.

WHEEL-LOCK.

1,358,744.      Specification of Letters Patent.      Patented Nov. 16, 1920.

Application filed July 7, 1919. Serial No. 309,171.

*To all whom it may concern:*

Be it known that I, IGNACE IZSAK, a citizen of the United States, residing in Chicago, in the county of Cook, in the State of Illinois, have invented new and useful Improvements in Wheel-Locks, of which the following is a specification.

This invention relates to improvements in wheel locks for automobiles, and more especially to a combination lock adapted for attachment to and use in connection with a steering-wheel of an automobile or similar machine, to render the wheel inoperative and thus prevent the machine from being steered properly if an attempt is made to steal it.

Another feature of my invention is to provide a combination lock adapted to be attached to and used in connection with a steering post and wheel of standard construction without alteration of the standard parts or with but slight alteration.

A device embodying the principles of my invention is illustrated in the accompanying drawings in which:

Fig. 1 is an axial section through the lock.

Fig. 2, is a horizontal section on the line 2—2 of Fig. 1, looking in the direction indicated by the arrows.

Fig. 3, is a similar section on the line 3—3 of Fig. 1.

Fig. 4, is a similar section on the line 4—4 of Fig. 1.

Fig. 5, is a similar section on the line 5—5 of Fig. 1.

Fig. 6, is a top plan view of the device.

Fig. 7, is a view in elevation of the upper part of the lock.

As shown in said drawings, 10 indicates the upper part of the steering post of an automobile having a portion 11, at its end reduced in diameter to engage in an opening in the hub 12, of a steering-wheel 13. Above the reduced part 11, the steering post is further reduced in diameter and extends above the hub of the wheel as indicated by 15, and is threaded to receive a nut which ordinarily holds the wheel in place. The bottom end of the threaded part 15, and the top end of the reduced part 11, are separated by the shoulder 14. At diametrically opposite points on the reduced part 11, of the steering post, extending upwardly the entire length of the projecting part 15, to the end of the post, are two vertical keyways 16, 16. In the hub 12, of the steering wheel 13, is also a vertical keyway 17 adapted to lie adjacent one of the keyways 16 in order that a feather or key may be inserted into the two keyways 16 and 17 to fix the wheel against rotation with respect to the post. These parts, as they have been described, constitute an ordinary and standard form of construction of steering post and wheel. Their particular construction, as herein illustrated, is not a part of the present invention. My improved lock, however, is adapted to be readily attached to these parts with but slight or no alteration in order to provide a lock by means of which the wheel may be fixed against rotation with respect to the post and thus become operative, or may be freed and locked in this position; and this structure which permits ready attachment to standard parts is one of the features of my invention.

In the practice of this invention, the nut which ordinarily secures the wheel in place, is removed from the threaded end 15, of the steering post and also the key or keys which were used for fixing the wheel against rotation on the post. There is then screwed onto the end 15, the circular nut 20 which has on its lower side, the projecting flange 21, and on its outer cylindrical surface, a circumferential groove 23. On the inner cylindrical surface of the nut 20, at diametrically opposite points, are two vertical keyways 22, 22. The nut 20 is screwed down against the shoulder 14 at the end of the threaded part 15 and tightened up until each of the keyways 22, lies adjacent one of the keyways 16. The feather or key 29 is then driven in to fix the nut against rotation and prevent its removal so that the upper end of the key 29 lies flush with the top surface of the steering post and its lower end a short distance above the shoulder 14. There is then placed over the nut 20 the lock proper which comprises a hollow cylinder consisting of the outer shell 30 and the inner shell 31, the inner shell 31, being expanded within the outer shell 30 and permanently fixed in position. The bottom edge of the inner shell 31 is adapted to rest on the top surface of the flange 21 and the bottom edge of the outer shell 30 extends a slight distance below the lower edge of the nut 20.

Near the bottom edge of the hollow cylinder are three holes 33, 33 extending through both the inner shell 31 and the outer shell 30 adapted to accommodate the three dowel pins 34, 34 the inner ends of which extend into the circumferential groove 23 in the nut 20 and prevent the removal of the lock proper. The dowel pins 34, 34 form a driving fit in the holes 33, 33 and are driven in until their outer ends are flush with the outer surface of the outer shell 30. The groove 23, is of such a size that the dowel pins will fit loosely therein and permit the free rotation of the lock proper for a purpose to be explained hereinafter.

In the upper part of the lock are arranged three annular disks, the uppermost being indicated by 38, the middle disk by 39, and the lowermost disk by 40. The disks 38 and 39 are separated by the spacing washer 41 and the disks 39 and 40 are separated by the spacing washer 42. Below the annular disk 40 there is fixed within the inner shell 31 a diaphragm 43 which is positively held in place by means of the three radially extending tongues 44, 44 which engage in corresponding holes in the inner shell 31. The upper end of the inner shell 31 is closed by means of the plate 45 which is wedged into its upper end.

Between the plate 45 and the disk 38 lies the dished washer 46 formed of thin metal and adapted to exert a slight pressure downward in order to press the three disks and spacing washers together. Each of the spacing washers 41 and 42 is slit as indicated by 49 (see Fig. 3,) and each of these washers is slightly sprung out of a plane in order to exert a slight pressure against each of the adjacent disks and furnish a slight frictional engagement to prevent too free rotation of the disks.

The upper part of the lock is covered by cap 50 which lies just above the plate 45 with a depending flange extending downward a short distance over the outside of the top end of the inner shell 31. The cap 50 is held in place by shrinking it on.

The outer shell 30 extends upwardly to a point approximately the same height as the diaphragm 43. Surrounding the inner casing and lying between the top end of the outer shell 30 and the bottom edge of the flange on the cap 50, are three loosely mounted rotatable rings, the uppermost being indicated by 51, the middle by 52 and the lower by 53. These rings are of the same thickness as the outer shell 30 and of sufficient width to completely fill the space between the top of the outer shell 30 and the bottom of the flange on the cap 50.

Through the cap 50 and the plate 45 is provided a rectangular hole for the purpose of accommodating the vertically sliding bolt 60 which has riveted to its upper end, reduced in size, the knob 61 and which has depending from its lower end, at one side, the feather or key 62. The bolt 60 and the key 62 are of sufficient length so that when the bolt is in its lowermost position the key 62 is adapted to extend downwardly into one of the keyways 16 on the steering post and the keyway 17 on the wheel when they are brought into adjacent positions in order to lock the wheel against rotation on the post. When the bolt is raised to its uppermost position the bottom end of the key 62 is entirely out of the keyway 16 with its bottom end slightly above the upper end of the steering post, thus permitting the steering wheel to rotate freely on the end of the post. The bolt 60 is shown in its bottom position in solid lines in Fig 1, and in its upper position in dotted lines in the same figure. The bolt 60 is limited in its downward movement by the engagement of the knob 61 with the cap 50; and to limit its upper movement there is provided a pin 64 which engages with the plate 45.

The dished washer 46, the two spacing washers 41 and 42, and the diaphragm 43 have each a circular hole of sufficient diameter to permit the free up and down movement of the bolt 60 and the stop pin 64. The diaphragm 43 has also depending from it the two tongues or guides 70, 70 which lie adjacent the edges of the bolt 60 to keep it in alinement as it is moved up and down.

On the outer edges of the bolt 60 are made two series of notches 80, 80 corresponding to the relative distances between the disks 38, 39 and 40; and at two diametrical points in the inner periphery each of such disks are made corresponding notches 81, 81 so that when the disks are turned in certain angular positions the notches will be in line and the bolt 60 free to slide upward or downward; and when the bolt 60 is in either its upper or lower position one or more of the disks 38, 39 or 40 may be turned so that the notches fall out of line and the bolt 60 is then locked in position. Each of the disks 38, 39 and 40 have also a false notch 82 for the purpose of deceiving anyone tampering with the lock and attempting to unlock it by feeling or hearing the engagement of the notches 80, 80 with the edges of the bolt 60. The false notches 82, 82 will furnish a slight sound or resistance apparent to the sense of touch when brought into engagement with either edge of the bolt 60 but will not permit the bolt to slide because none of the false notches 82, 82 have the necessary corresponding notches at points diametrically opposite.

For the proper manipulation of the disks 38, 39 and 40 each of them is made with a series of notches 84, 84 on its periphery, (see Fig. 2,). Each of the rings 51, 52 and 53 is provided with a threaded hole 85 in which may be screwed the pins 86, 86. The inner end of each of the pins 86 is elongated and reduced in size and adapted to be inserted into one of the notches 84 on the corresponding disk. The inner shell 31 is provided with three circumferential slots 90, 90 each extending about 120 degrees, one of such slots lying adjacent each of the disks 38, 39 and 40. For the purpose of manipulating the disks 38, 39 and 40 one of the pins 86 is screwed into each of the dust rings 51, 52 and 53, each with its inner end projecting through the corresponding slot 90, and engaging with one of the notches 84 in the corresponding disk 38, 39 or 40. It is apparent that the position of the pins 86, 86 may be varied when the notches 81, 81 of the three disks 38, 39 and 40 are in line, by changing the pins 86 to engage with various ones of the notches 84, 84. It is apparent that by this procedure the combination of the lock may be varied.

The cap 50 is provided on its upper surface with a series of numerals 95, 95 for the purpose of noting the position of the pins 86, 86.

As stated before, since the dowel pins 34, 34 fit loosely in the groove 23 the lock proper is permitted to rotate freely when the bolt 60 is in its uppermost position. One of the purposes of thus permitting the lock proper to rotate is to prevent the lock, when the wheel is free, from being fixed against rotation on the steering post. If the lock were thus fixed there is a possibility that anyone wishing to steal the car could grasp it with sufficient strength to steer the vehicle.

In the operation of my device when the bolt 60 is in its upper position as shown in dotted lines in Fig. 1, the key is withdrawn from the keyway 16 and the steering wheel is free to rotate on the steering post 10. When the bolt 60 is in this position the disks 38, 39 and 40 are turned by means of pins 86, 86 so that the notches 81, 81 are not in alinement with the edges of the bolt 60. The bolt 60 is therefore locked in its upper position and prevented from being depressed. When it is desired to unlock the car, that is to fix the wheel 13 against rotation, the disks 38, 39 and 40 are moved by means of the pins 86 until the notches 81, 81 are in alinement with the edges of the bolt 60 so that this bolt is permitted to descend. The bolt 60 is then pushed downward until the bottom end of the key 62 engages with the upper surface of the nut 20. The lock is then rotated until the bottom end of the key 62 drops into the keyway 22 and the adjacent keyway 16 on the side opposite the key 29. The wheel 13 is then rotated until the keyway 17 is directly under the key 62 when the bolt 60 will drop to its lowermost position, the key 62 entering the keyway 17 in the wheel and fixing it against rotation on the steering post. When in this position the disks 38, 39 and 40 may again be moved if desired thus locking the bolt 60 in its bottom position and preventing its withdrawal.

I claim:

1. In combination with a steering post, a wheel mounted on the end thereof, the end of the post projecting above the wheel, a lock comprising a nut with a circumferential groove adapted to be fastened onto the projecting end of the post, a hollow cylinder covering the nut with inwardly projecting pins engaging with the circumferential groove, and a depending key adapted to engage with keyways in the post and wheel to fix the wheel against rotation on the post.

2. In combination with a steering post, a wheel mounted on the end thereof, the end of the post projecting above the wheel, a lock comprising a nut with a circumferential groove adapted to be fastened onto the projecting end of the post, a hollow cylinder covering the nut with inwardly projecting pins engaging with the circumferential groove, a sliding bar in the cylinder adapted to be moved downward to engage with keyways in the post and wheel to fix the wheel against rotation on the post, a notch in the sliding bar, and an adjustable disk in the cylinder with a corresponding notch whereby the disk may be turned to permit the bar to slide in its notch or may be turned to lock the bar against movement.

In witness whereof, I have hereunto subscribed my name this 3 day of July, 1919.

IGNACE IZSAK.